Figure 1:
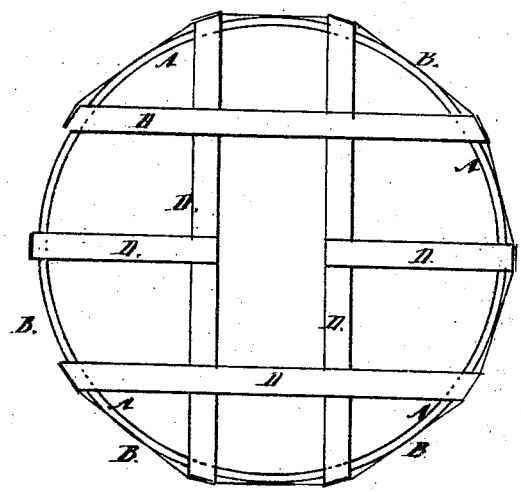
Figure 2:
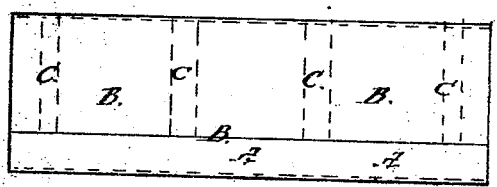

M. Bradley.
Preventing Heating Mill Burrs.
N° 71690      Patented Dec. 3, 1867.

Daniel Wilkinson
James M Brown    Menter Bradley

United States Patent Office.

MENTOR BRADLEY, OF PERU, INDIANA.

Letters Patent No. 71,690, dated December 3, 1867.

---

IMPROVED MODE OF PREVENTING THE HEATING OF MILL-BURRS.

---

*The Schedule referred to in these Letters Patent and making part of the same.*

---

TO ALL WHOM IT MAY CONCERN:

Be it known that I, MENTOR BRADLEY, of the city of Peru, in the county of Miami, and State of Indiana, have invented a new and improved Mode of Preventing the Heating of Mill-Burrs while grinding, and of preventing the heating, sweating, and balling of flour and other substances being ground thereon.

The nature of my invention consists of a hoop, A, about four inches wide, resting on the platform of the bed-burr, and surrounding the burrs at the ordinary distance from the same, which is suppoted by the framework D D, &c., with ten posts, more or less, marked C C, which are of sufficient height to reach above the upper burr, and to the lower part of which the hoop is attached on the outside. Around the hoop A is attached canvas, B B, or other light material of like character, and passing around the posts C C to keep it in position, and of sufficient width to reach from the bed-burr to the top or upper surface of the upper burr, and when the ends of the canvas meet they are attached by hooks upon any one of the upright posts C C.

To enable others skilled in the art to make and use my invention, I construct the framework D D with the posts C C sufficiently wide apart to admit of the hoop A A passing around the same, of the proper size to surround the burrs, the outside of the hoop A A being even with the outside of the posts C C, and fasten the hoop to the same. Around this hoop and posts I stretch the canvas, or any light similar material, and raise it to the top of the burr and fasten it by means of the hooks placed in one or more of the posts.

As the burr commences heating by running, I lower the canvas to any desired point towards or below the top of the hoop A A, so as to admit of a free contact of the air with the upper burr, thus preventing the heating of the same, and also of the flour or other substance being ground thereon.

What I claim as my invention, and desire to secure by Letters Patent, is—

The narrow hoop A A and canvas or other similar light material, adjustable to any desired height around the burrs.

MENTOR BRADLEY.

Witnesses:
    JAMES M. BROWN,
    W. B. HANK.